United States Patent [19]

Reik

[11] Patent Number: 4,513,849
[45] Date of Patent: Apr. 30, 1985

[54] FRICTION CLUTCH

[75] Inventor: Wolfgang Reik, Bühl, Fed. Rep. of Germany

[73] Assignee: LuK Lamellen und Kupplungsbau GmbH, Bühl, Fed. Rep. of Germany

[21] Appl. No.: 398,717

[22] Filed: Jul. 15, 1982

[30] Foreign Application Priority Data

Feb. 10, 1982 [DE] Fed. Rep. of Germany ....... 3204533

[51] Int. Cl.³ .......................... F16B 13/44; F16F 1/32
[52] U.S. Cl. ................................ 192/70.27; 192/89 B;
267/161; 267/181
[58] Field of Search ........................... 192/70.27, 89 B;
267/161, 162, 163, 181

[56] References Cited

U.S. PATENT DOCUMENTS 2,117,482 5/1938 Klix ............................ 192/70.27 X

FOREIGN PATENT DOCUMENTS

| 1752253 | 9/1957 | Fed. Rep. of Germany . | |
| 1198214 | 8/1965 | Fed. Rep. of Germany | 192/89 B |
| 1212363 | 3/1966 | Fed. Rep. of Germany | 192/89 B |
| 1475272 | 3/1969 | Fed. Rep. of Germany | 192/89 B |
| 2911723 | 10/1980 | Fed. Rep. of Germany . | |
| 1125976 | 11/1956 | France . | |
| 1502743 | 10/1967 | France . | |
| 1599075 | 8/1970 | France . | |
| 2311221 | 12/1976 | France | 192/89 B |

Primary Examiner—Rodney H. Bonck
Attorney, Agent, or Firm—Peter K. Kontler

[57] ABSTRACT

A friction clutch wherein a diaphragm spring is installed between two ring-shaped seats intermediate an axially movable pressure plate and a cover and has a circumferentially complete outer marginal portion extending beyond the seats and engaging with projections of the pressure plate. The spring has a radially innermost portion formed by an annulus of prongs whose tips surround an opening and which alternate with radially outwardly extending open slots. Such open slots alternate and overlap in part with the inner portions of closed slots whose outer portions are holes forming an annulus inwardly of the outer marginal portion. The regions of overlap between the open and closed slots include bridges which together constitute an annular tension spring enabling the diaphragm spring to store energy in addition to that which is stored in the outer marginal portion. The diaphragm spring can be tilted between the seats by a release bearing which cooperates with the tips of the prongs. Rivets, whose shanks extend through the holes of the diaphragm spring, secure the diaphragm spring and one or both seats to the cover.

15 Claims, 5 Drawing Figures

FRICTION CLUTCH

CROSS-REFERENCE TO RELATED CASE

The structure which is described and shown in the present application is identical with that in the commonly owned copending application Ser. No. 398,637 filed by me on July 15, 1982, for "Friction clutch and diaphragm spring therefor".

BACKGROUND OF THE INVENTION

The present invention relates to friction clutches in general, and more particularly to improvements in friction clutches of the type wherein one or more pressure plates can be biased axially by a diaphragm spring. Still more particularly, the invention relates to improvements in friction clutches of the type wherein the diaphragm spring is tiltable or pivotable between two annular seats which are carried by a cover and wherein the pressure plate is engaged by that (outer) marginal portion of the diaphragm spring which extends radially outwardly beyond the seats. The means for engaging or disengaging a friction clutch of such character can comprise an actuating device in the form of a release bearing which can tilt the diaphragm spring between the seats by acting upon the tips of prongs which form part of the diaphragm spring and extend radially inwardly of the seats.

A friction clutch of the above outlined character is disclosed, for example, in commonly owned German Offenlegungsschrift No. 2,911,723. The diaphragm spring which is used in the friction clutch of this German publication resembles a hollow conical frustum having a circumferentially complete outer marginal portion and an annulus of radially inwardly extending prongs whose tips surround a centrally located opening and which are separated from one another by elongated radially extending slots having enlarged outer portions in the form of holes forming an annulus which is inwardly adjacent the marginal portion. The enlarged outer portions of the slots can have a substantially circular, elliptical or other outline.

A drawback of heretofore known diaphragm springs and of friction clutches which employ such diaphragm springs is that the magnitude of torque which can be transmitted is limited or can be increased only by departing from the optimal design and/or dimensions of the friction clutch.

OBJECTS AND SUMMARY OF THE INVENTION

An object of the invention is to provide a friction clutch which can transmit substantial amounts of torque without departing from the optimum design and/or dimensions of its components.

Another object of the invention is to provide the friction clutch with a novel and improved diaphragm spring which can apply greater force than heretofore known diaphragm springs of identical outer diameter and/or thickness.

A further object of the invention is to provide a friction clutch wherein the manner of mounting the diaphragm spring and/or other components need not be appreciably altered in spite of the fact that the diaphragm spring can apply forces which greatly exceed those transmittable by heretofore known diaphragm springs.

An additional object of the invention is to provide a friction clutch which can transmit substantial amounts of torque even though the outer diameter, the thickness and/or mass of its diaphragm spring need not exceed the corresponding parameters of heretofore known and used diaphragm springs.

Still another object of the invention is to provide a friction clutch wherein the tension in the outer marginal portion of the diaphragm spring can be reduced without reducing the force with which the diaphragm spring can bear or react against adjacent components of the friction clutch.

A further object of the invention is to provide a friction clutch wherein the useful life of the diaphragm spring is increased beyond that of, and which can stand longer periods of uninterrupted service than, heretofore known friction clutches.

Another object of the invention is to provide a friction clutch which is more reliable and requires less frequent servicing than heretofore known friction clutches.

An additional object of the invention is to provide a friction clutch which is capable of furnishing a wide variety of characteristic curves including curves not achievable with conventional friction clutches, especially with conventional friction clutches employing heretofore known diaphragm springs.

The invention is embodied in a friction clutch which comprises a cover, a pressure plate, a pair of annular seats between the cover and the pressure plate, and a diaphragm spring which is disposed between the seats and has a circumferentially complete outer marginal portion located radially outwardly of the seats and engaging with the pressure plate. The diaphragm spring further comprises a plurality of prongs which are disposed inwardly of the seats and have tips which define an opening. The diaphragm spring is formed with open slots which alternate with the prongs and closed slots including preferably hole-like outer portions inwardly adjacent the outer marginal portion and disposed radially outwardly of the open slots. The closed slots further have inner portions which extend substantially radially inwardly and terminate short of the tips of the prongs, i.e., short of the opening. Each pair of neighboring open slots flanks at least one closed slot and the inner portions of closed slots overlap the neighboring open slots, as considered in the radial direction of the diaphragm spring. The friction clutch further comprises fastener means extending through the outer portions of some or all of the closed slots to secure the diaphragm spring and one or both seats to the cover, and actuating means for tilting the diaphragm spring between the seats in order to engage or disengage the clutch. The actuating means can include a release bearing or other suitable means for tilting the diaphragm spring through the medium of the prongs. The inner portions of neighboring closed slots can be at least substantially parallel to each other, at least in the region of overlap between the open and closed slots.

The inner diameter of the annulus which is formed by the outer portions of closed slots in the diaphragm spring equals or exceeds the outer diameter of the annulus of open slots. The difference between the outer diameter of the annulus of outer portions and the outer diameter of the annulus of open slots preferably equals or exceeds 15 percent. The width of outer portions of the closed slots (as considered in the circumferential direction of the spring) can greatly exceed the width of the respective inner portions and/or the width of the open slots.

The edge faces which flank the prongs are or can be at least substantially parallel to each other, at least in the regions of overlap between the open and closed slots. The diaphragm spring further comprises bridges or lands extending between the inner portions of the prongs and the webs between neighboring outer portions of the closed slots, and the width of each bridge can be at least substantially constant, at least in the regions of overlap between the open and closed slots. If the open slots diverge radially outwardly, the pairs of edge faces which flank such open slots are preferably at least substantially parallel with the inner portions of neighboring closed slots, at least in the regions of overlap between the open and closed slots.

If the number of closed slots exceeds the number of open slots, each pair of neighboring open slots can flank the inner portions of several (e.g., two) closed slots.

The material of the diaphragm spring inwardly of the annulus of outer portions of the closed slots constitutes a circumferentially complete undulate annular tension spring which can store energy in addition to that stored in the outer marginal portion. The tension spring is integral with the webs which alternate with the outer portions of the closed slots.

The novel features which are considered as characteristic of the invention are set forth in particular in the appended claims. The improved friction clutch itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
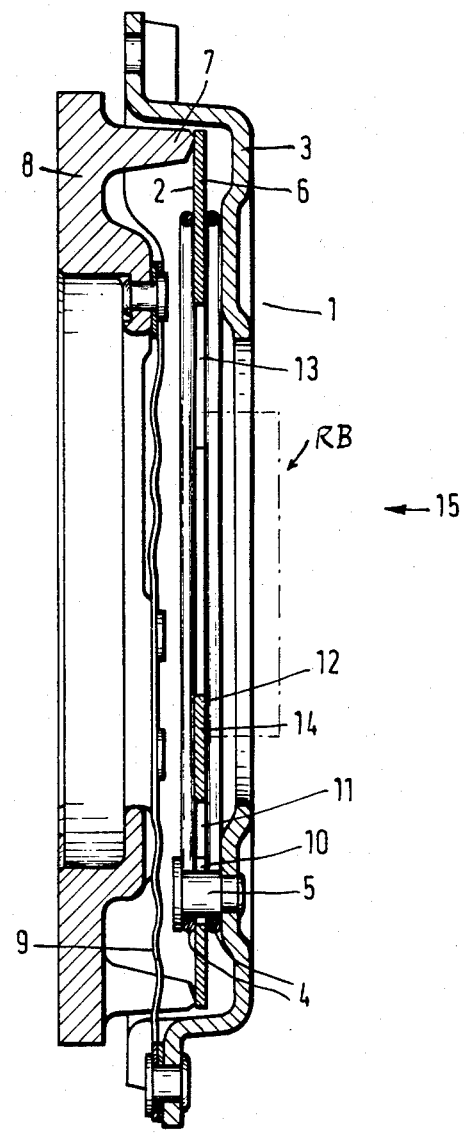
FIG. 1 is an axial sectional view of a friction clutch which embodies one form of the invention.

FIG. 1 shows a friction clutch 1 comprising a diaphragm spring or cup spring 2 which is pivotably mounted on a clutch cover 3 between ring-shaped seats 4 and is secured to the cover by fasteners in the form of rivets or bolts 5. The radially outermost part of the circumferentially complete outer marginal portion or rim 6 of the diaphragm spring 2 engages the projections 7 of an axially movable pressure plate 8. Leaf springs 9 are provided to transmit torque between the cover 3 and the pressure plate 8. The cover 3 can be secured to a flywheel which is mounted on the crankshaft of an engine, e.g., the internal combustion engine of an automotive vehicle.

The shanks of the rivets 5 extend through holes 10 which are provided in the diaphragm spring 2 radially inwardly of the rim 6 and constitute the enlarged outer portions of elongated closed slots having relatively narrow slit-shaped inner portions 11 which extend substantially radially of the diaphragm spring 2 to terminate short of the inner end portions or tips 12 of fingers or prongs 14 alternating with substantially radially extending elongated open slots 13.

The clutch 1 can be actuated in any conventional manner, e.g., by actuating means in the form of a release bearing RB which can be moved (note the arrow 15) against the tips 12 of the prongs 14 so as to tilt the diaphragm spring 2 between the seats 4 and to thus relax the pressure of the rim 6 upon the pressure plate 8.

Figure 2:
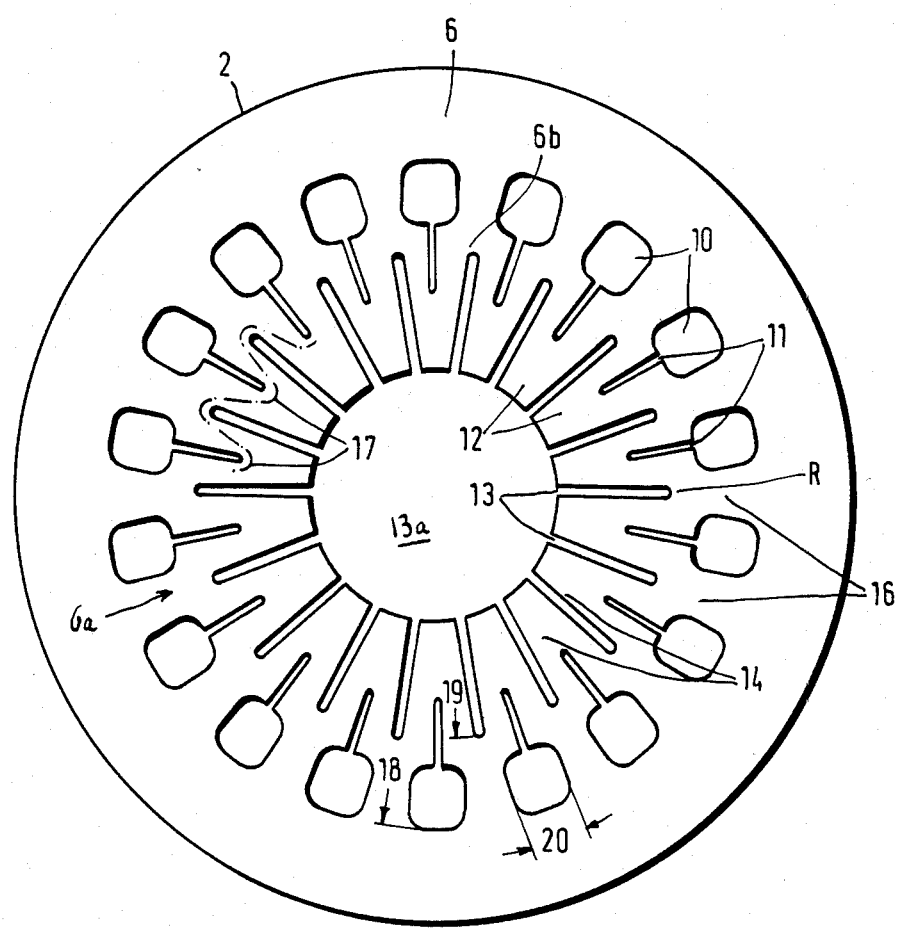
FIG. 2 is an elevational view of the diaphragm spring which is utilized in the friction clutch of FIG. 1.

The diaphragm spring or cup spring 2 is shown in full detail in FIG. 2. This spring comprises the aforementioned circumferentially complete outer marginal portion or rim 6 and a second or inner portion 6a which is disposed radially inwardly of the rim 6 and is formed with two annuli of slots including the aforementioned open slots 13 alternating with the radially extending fingers or prongs 14, and closed outer slots having the aforementioned enlarged outer portions in the form of nearly circular holes 10 and the much narrower radially inwardly extending inner portions 11. The free inner end portions or tips 12 of the prongs 14 define and surround a centrally located opening 13a which communicates with the open slots 13. The width 20 of holes 10 of the closed slots, as considered in the circumferential direction of the spring 2, is a multiple of the width of the inner portions 11 and/or open slots 13. The holes 10 form an annulus which is inwardly adjacent the rim 6 and whose outer diameter 18 exceeds the outer diameter 19 of the annulus of open slots 13 by at least 15 percent. The smallest diameter of the annulus consisting of inner portions 11 of closed slots is smaller than the diameter 19, i.e., the inner portions 11 of the closed slots overlap the outer portions of the neighboring open slots 13, as considered in the radial direction of the spring 2.

The holes 10 of the closed slots are separated from each other by an annulus of radially disposed ribs or webs 16 which are integral with the rim 2 as well as with a meandering or undulate zone 17 of the inner portion 6a, such zone constituting a circumferentially complete annular energy storing tension spring R which is inwardly adjacent to the rim 6. The formation of the spring R is due to the fact that the innermost parts of inner portions 11 of the closed slots terminate short of the opening 13a, i.e., short of the tips 16 of the prongs 14. In the embodiment of FIG. 2, each pair of neighboring open slots 13 flanks the inner portion 11 of a single closed slot, and the inner portions 11 are located midway between the neighboring open slots 13.

The spring R is defined by the open slots 13 and by the inner portions 11 of the closed slots, and is integral with the webs or ribs 16 between the holes 10 of the closed slots. The spring R is further integral with the prongs 14 which can be said to constitute a third or innermost portion of the spring 2 and a constituent of the second portion 6a. The bridges or lands 6b which are disposed in the regions of overlap of open slots 13 with the inner portions 11 form part of the tension spring R.

The width of the open slots 13 may but need not equal the width of inner portions 11 of the closed slots, and each such width can be a small fraction of the width 20 of a hole 10. In the spring 2, the width of each open slot 13 is constant from the innermost to the outermost part thereof, and the same holds true for the width of inner portions 11 of the closed slots.

Figure 3:
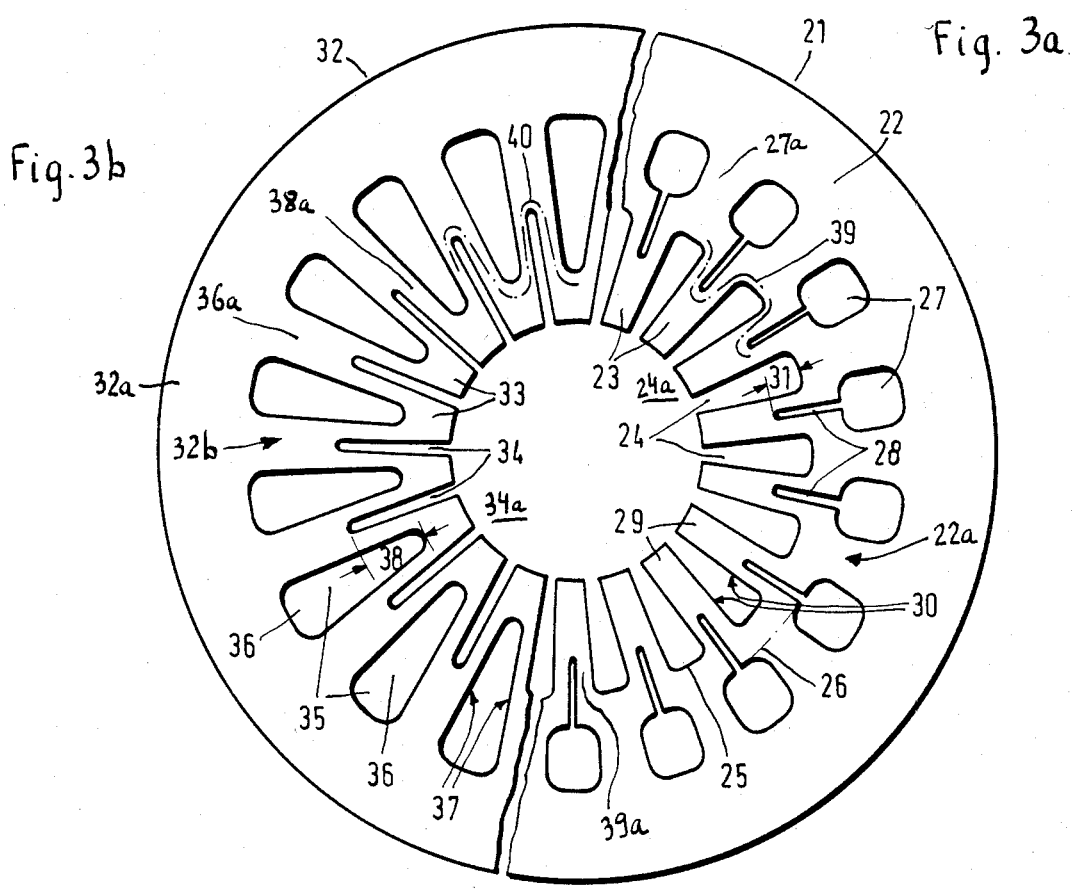
FIG. 3a is a fragmentary elevational view of a diaphragm spring which can be utilized in the friction clutch in lieu of the diaphragm spring of FIG. 2.
FIG. 3b is a fragmentary elevational view of a third diaphragm spring which can be utilized in the friction clutch of FIG. 1.

FIG. 3a shows approximately one-half of a diaphragm spring or cup spring 21 having a circumferentially complete outer marginal portion of rim 22 and a second portion 22a located inwardly of the rim 22, defining a substantially centrally located opening 24a and having an annulus of fingers or prongs 23 alternating with open slots 24 whose width increases radially outwardly, i.e., toward the annulus of holes 27 constituting the enlarged outer portions of closed slots whose inner portions 28 have a constant width and partially overlap the open slots 24, as considered in the radial direction of the spring 21. The inner end portions or tips 29 of the prongs 23 are immediately adjacent to the opening 24a. The radially outermost parts 25 of the outwardly diverging open slots 24 are located radially inwardly of the circle 26 defined by the innermost parts of the holes 27. The extent of overlap between the outer portions of open slots 24 and the inner portions 28 of the closed slots is shown at 31. The material of the inner portion 22a in the regions of overlap between the open and closed slots constitutes a circumferentially complete meandering or undulate zone acting not unlike an annular tension spring 39 which is integral with the ribs or webs 27a between the holes 27 as well as with the prongs 23. The inner portion 28 of each closed slot is flanked by the outer portions of the neighboring open slots 24. The inner portions 28 terminate short of the tips 29 of the prongs 23, i.e., they terminate radially outwardly of the centrally located opening 24a.

The taper of the edge faces 30 flanking the open slots 24 is selected in such a way that these edge faces are at least substantially parallel to the longitudinal extensions of inner portions 28 of the adjacent closed slots. This ensures that the width of bridges or lands 39a together constituting at least the major part of the tension spring 39 is at least substantially constant, as considered in the circumferential direction of the spring 21. The bridges 39a can be said to constitute the radially outermost parts of the prongs 23. The bridges 39a are substantially parallel to the neighboring slots 24 and inner portions 28, and the width of the prongs 23 is substantially constant, at least in the regions of overlap between the open slots 24 and the inner portions 28 of the closed slots.

The diaphragm spring or cup spring 32 of FIG. 3b comprises a circumferentially complete outer marginal portion or rim 32a and a second portion 32b having an annulus of radially extending fingers or prongs 33 whose inner end portions or tips surround a centrally located opening 34a communicating with radially extending open slots 34 which alternate with the prongs 33. The width of the open slots 34 is constant; however, the width of the inner portions 35 of the closed slots in the second portion 32b of the spring 32 increases radially outwardly toward the rim 32a so that the maximum width of the inner portion 35 matches the minimal width of the outer portion or hole 36 of the respective closed slot. The edge faces 37 bounding the inner portions 35 of the closed slots are at least substantially parallel to the neighboring open slots 34 so that the width of bridges or lands 38a in the regions 38 where the open slots 34 overlap the inner portions 35 of the closed slots is at least substantially constant. The lands 38a form part of a meandering or undulate zone 40 which can be said to constitute a circumferentially complete energy storing tension spring forming part of the second portion 32b and being integral not only with the ribs or webs 36a between neighboring outer portions 36 but also with the prongs 33.

Figure 4:
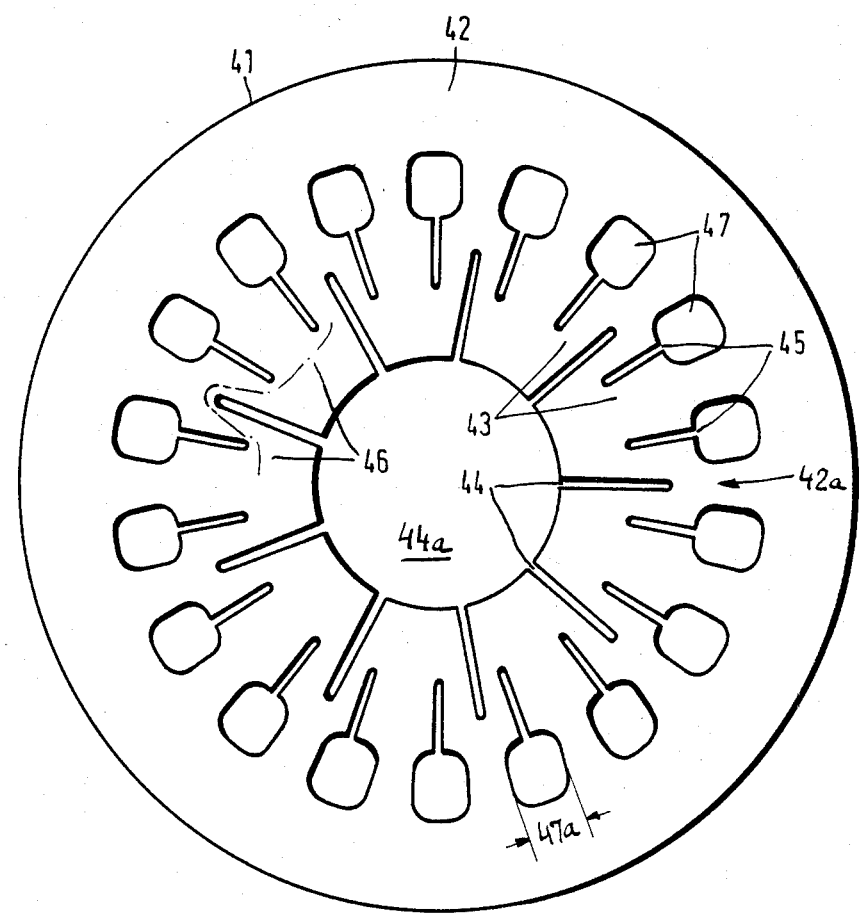
FIG. 4 is an elevational view of a fourth diaphragm spring which can be utilized in the friction clutch of FIG. 1.

The diaphragm spring or cup spring 41 of FIG. 4 has a circumferentially complete outer marginal portion or rim 42 and a second portion 42a defining a centrally located opening 44a and having an annulus of radially outwardly extending fingers or prongs 43 whose inner end portions or tips surround the opening 44a and which are separated from one another by radially outwardly extending open slots 44 of constant width. The width of the prongs 43 increases radially outwardly toward the annulus of enlarged outer portions or holes 47 forming part of closed slots whose inner portions 45 are narrow slits of constant width extending in at least substantial parallelism with the adjacent open slots 44. The outermost parts of the open slots 44 are located radially outwardly of the innermost parts of inner portions 45 of the closed slots. The width 47a of each hole 47 greatly exceeds the width of an inner portion 45 and/or the width of an open slot 44. In the embodiment of FIG. 4, the number of closed slots exceeds the number of open slots 44 so that each pair of neighboring open slots 44 flanks the inner portions 45 of two closed slots. The innermost parts of inner portions 45 of the closed slots terminate short of the opening 44a, i.e., short of the tips of the prongs 43; this causes the formation of a circumferentially complete annular energy storing tension spring or meandering zone 46 which includes the bridges or lands in the regions of overlap between the inner portions 45 of the closed slots and the outer portions of the open slots 44.

The clutch of FIG. 1 can employ the diaphragm spring 21, 32 or 41 in lieu of the spring 2.

The invention is based, at least in part, on the discovery that, even though a diaphragm spring constitutes that form of spring which can store (statically or dynamically) the maximal amounts of elastic energy per unit volume, the utilization of the material of heretofore known diaphragm springs is far from satisfactory because the elastic energy can be stored practically exclusively in the outer marginal portion of the diaphragm spring, namely, in the portions which is disposed radially outwardly of the enlarged outer portions of the open slots which alternate with the prongs. In other words, only a relatively small fraction of the overall volume of the material of a heretofore known diaphragm spring can be used for the storage of energy, and the entire stored energy is concentrated in the circumferentially complete outer marginal portion of a conventional diaphragm spring. The simplest way to increase the capacity of a diaphragm spring to store energy would be to increase its thickness and/or its outer diameter. This is not always possible, especially not in many types of friction clutches, because the outer diameters of diaphragm springs in such devices cannot be increased at will, and the same applies for the thickness of the material of diaphragm springs. Moreover, by unduly increasing the outer diameter and/or the thickness of the diaphragm spring, the designer of such spring would adversely influence the so-called $h_o/s$ ratio wherein $h_o$ denotes the distance which a normally hollow frustoconical diaphragm spring must cover in order to be converted into a flat body and s is the thickness of the diaphragm spring. Departures from the optimum $h_o/s$ ratio would reduce the useful life or service life of the diaphragm spring.

An important advantage of the improved friction clutch is that its diaphragm spring can store substantial amounts of energy without the need to increase its thickness and/or its outer diameter. This is due to the fact that the diaphragm spring embodies several zones or regions which can store energy, i.e., energy can be stored in the outer marginal portion as well as in the (second) portion which is located radially inwardly of the outer marginal portion. That portion of a conventional diaphragm spring which includes the prongs merely acts as a lever that can be of assistance in changing the condition (conicity) of the diaphragm spring but such portion does not store any energy. With reference to the diaphragm spring 2 of FIGS. 1 and 2, this spring can store energy in the outer marginal portion 6 as well as in the tension spring R which includes the material that is located radially inwardly of the enlarged outer portions or holes 10 of the closed slots and which is integrally connected with the tips 12 of the prongs 14 as well as with the webs or ribs 16 between the holes 10. The material of bridges or lands 6b in the regions of overlap between the open slots 13 and inner portions 11 of the closed slots can store substantial amounts of energy in addition to that energy which is stored in the outer marginal portion 6. This is attributable to the recognition that the open slots need not extend all the way to and need not communicate with the holes 10 which are inwardly adjacent to the outer marginal portion 6, i.e., that the length of open slots 13 can be reduced and the length of closed slots including the holes 10 can be increased radially inwardly to thus form the aforediscussed circumferentially complete tension spring R which constitutes a means for storing energy in addition to that storable in the outer marginal portion 6. In other words, some of the material which is used to form part of prongs in a conventional diaphragm spring is put to use as a means for storing additional energy so that the diameter of the improved diaphragm spring (and of the improved friction clutch using such diaphragm spring) need not be increased if the manufacturer desires to transmit pronounced torque, i.e., if the diaphragm spring is to store large quantities of energy and to apply pronounced forces when the clutch is engaged.

The tension spring R stores energy in response to changes in conicity of the diaphragm spring 2 in a direction counter to the direction of application of force by the diaphragm spring, i.e., in response to changes in the mutual spacing of the prongs 14. Such changes in the configuration of the diaphragm spring 2 and in the mutual spacing of the prongs 14 entail a stressing of the material forming the tension spring R, i.e., stresses develop in the material of the diaphragm spring in the regions of overlap of the open and closed slots, and such stresses enable the material of the spring R to store energy in addition to that which is stored in the outer marginal portion 6.

The configuration of the enlarged outer portions of closed slots in the diaphragm spring 2, 21, 32 or 41 can depart from the illustrated configurations without adversely affecting the operation of the improved friction clutch. For example, the enlarged outer portions of the closed slots can have a truly or nearly circular, a truly or nearly oval or other outline, as long as they permit the passage of portions of means for fastening the diaphragm spring and one or both seats to the cover of the friction clutch. In some instances, the inner portions of neighboring closed slots (such as the inner portions 11 shown in FIG. 2) are preferably at least nearly parallel to each other, at least in the regions of overlap of the open and closed slots.

The distribution of open and closed slots in the diaphragm spring of the improved friction clutch is preferably such that the material of the second portion (such as 6a in FIG. 2) does not subject the material of the marginal portion (6 in FIG. 2) to any additional stressing when the conicity of the diaphragm spring changes. This is achieved in each of the illustrated diaphragm springs by the aforediscussed distribution of open and closed slots which allows the individual sections or portions of the tension spring to flex or resile relative to one another, i.e., the material of the tension spring exhibits a certain amount of elastic yieldability, as considered in the circumferential direction of the diaphragm spring. The neighboring bridges or lands of the tension spring can move relative to one another in view of the fact that the inner portions of closed slots overlap the outer portions of open slots, as considered in the radial direction of the diaphragm spring. This limits the magnitude of stresses and allows for so-called breathing of the second portion of the diaphragm spring.

By changing the aforediscussed ratio of the outer diameter of the annulus of holes forming the enlarged outer portions of closed slots and the outer diameter of the annulus formed by the open slots, one can influence certain characteristics of the diaphragm spring. Thus, by increasing the aforediscussed ratio well beyond or by reducing it toward 15 percent (namely, that the diameter 18 exceeds the diameter 19 by at least 15 percent, as viewed in FIG. 2), one can influence the flexibility of the prongs as well as the capacity of the tension spring to store energy.

The feature that the edge faces which bound the open slots are or can be at least substantially parallel to the adjacent inner portions of the closed slots (as shown in FIGS. 3a and 3b) can enhance the work capacity of the diaphragm spring. It is often sufficient if such parallelism is maintained only in the regions of overlap between the open and closed slots. On the other hand, the flexibility or stiffness of the prongs can be influenced, often in a highly desirable manner, by selecting the width and the orientation of open and closed slots, particularly in the regions of overlap between such slots, in a manner such as to ensure that the width of the lands or bridges (as considered in the circumferential direction of the diaphragm spring) will remain at least substantially constant i.e., that the cross-sections of such bridges will be constant in the regions where the inner portions of the closed slots overlap the open slots.

German Utility Model No. 1,752,253 discloses a tension spring which constitutes a circumferentially complete meandering body. However, this prior publication does not disclose the possibility of uniting such a tension spring with the circumferentially complete outer marginal portion of a diaphragm spring so that the tension spring can store energy in addition to that energy which is stored in the outer marginal portion. This is accomplished in the improved clutch by the simple expedient of converting the inner portion of a diaphragm spring into a tension spring which is connected with the outer marginal portion by webs which alternate with the outer portions of closed slots and which is also integral with the tips of the prongs.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A friction clutch, comprising a cover; a pressure plate; a pair of annular seats adjacent to said cover; a diaphragm spring disposed between said seats and having an outer marginal portion located radially outwardly of said seats and engaging said pressure plate, a plurality of holes inwardly adjacent said marginal portion, webs alternating with said holes, an annular tension spring inwardly adjacent said holes and integral with said webs, an annulus of prongs disposed inwardly of said seats and said tension spring and defining a centrally located opening, and slots alternating with said prongs, said slots having inner ends communicating with said opening and closed outer ends disposed radially inwardly of said holes; fastener means extending through said holes and securing said spring to said cover; and actuating means for tilting said spring between said seats.

2. The friction clutch of claim 1, wherein said actuating means comprises means, such as a release bearing, for tilting said spring through the medium of said prongs.

3. The friction clutch of claim 1, wherein said annulus comprises a plurality of prongs and said outer marginal portion is a circumferentially complete portion of said diaphragm spring, said prongs having tips which define said opening and said slots being open, said diaphragm spring further having closed slots including outer portions which constitute said holes and are inwardly adjacent said marginal portion and disposed radially outwardly of said open slots, said closed slots further having substantially radial inner portions terminating outwardly of said tips and each pair of neighboring open slots flanking at least one of said inner portions.

4. The friction clutch of claim 3, wherein the inner portions of said closed slots overlap said open slots, as considered in the radial direction of said spring, and the neighboring inner portions are at least substantially parallel to one another, at least in the regions of overlap with the adjacent open slots.

5. The friction clutch of claim 4, wherein the outer portions of said closed slots form a first annulus having an inner diameter and said open slots form a second annulus having an outer diameter which at most equals said inner diameter.

6. The friction clutch of claim 3, wherein the open slots of said spring form a first annulus having a first outer diameter and the outer portions of said closed slots form a second annulus having a second outer diameter exceeding said first outer diameter by at least 15 percent.

7. The friction clutch of claim 3, wherein the width of said holes, as considered in the circumferential direction of said spring, substantially exceeds the width of said inner portions.

8. The friction clutch of claim 7, wherein the width of said open slots is a relatively small fraction of the width of holes.

9. The friction clutch of claim 3, wherein the inner portions of said closed slots overlap the open slots, as considered in the radial direction of said spring, and said spring further comprises pairs of edge faces flanking said prongs and being at least substantially parallel to each other, at least in the regions of overlap between said open slots and the inner portions of said closed slots.

10. The friction clutch of claim 3, wherein the inner portions of said closed slots overlap said open slots, as considered in the radial direction of said spring, and said spring further comprises bridges disposed in the regions of overlap between said inner portions and said open slots, said bridges having pairs of edge faces which are at least substantially parallel to each other.

11. The friction clutch of claim 3, wherein said open slots overlap the inner portions of said closed slots, as considered in the radial direction of said spring, and said spring has pairs of edge faces flanking said open slots, said edge faces being at least substantially parallel to the neighboring inner portions, at least in the regions of overlap between said inner portions and said open slots.

12. The friction clutch of claim 3, wherein the number of closed slots in said spring exceeds the number of open slots.

13. The friction clutch of claim 12, wherein each pair of neighboring open slots flanks the inner portions of several closed slots.

14. In a friction clutch, a diaphragm spring having an outer marginal portion, a plurality of holes inwardly adjacent said marginal portion, webs alternating with said holes, an annular tension spring inwardly adjacent said holes and integral with said webs, an annulus of prongs inwardly adjacent said tension spring and defining a centrally located opening, and slots alternating with said prongs, said slots having inner ends communicating with said opening and closed outer ends disposed radially inwardly of said holes.

15. The friction clutch of claim 14, wherein said marginal portion is a circumferential complete marginal portion and said tension spring has an undulate shape.

* * * * *